No. 611,393. Patented Sept. 27, 1898.
J. PRISLEY.
DIGESTER.
(Application filed Oct. 4, 1897.)
(No Model.)
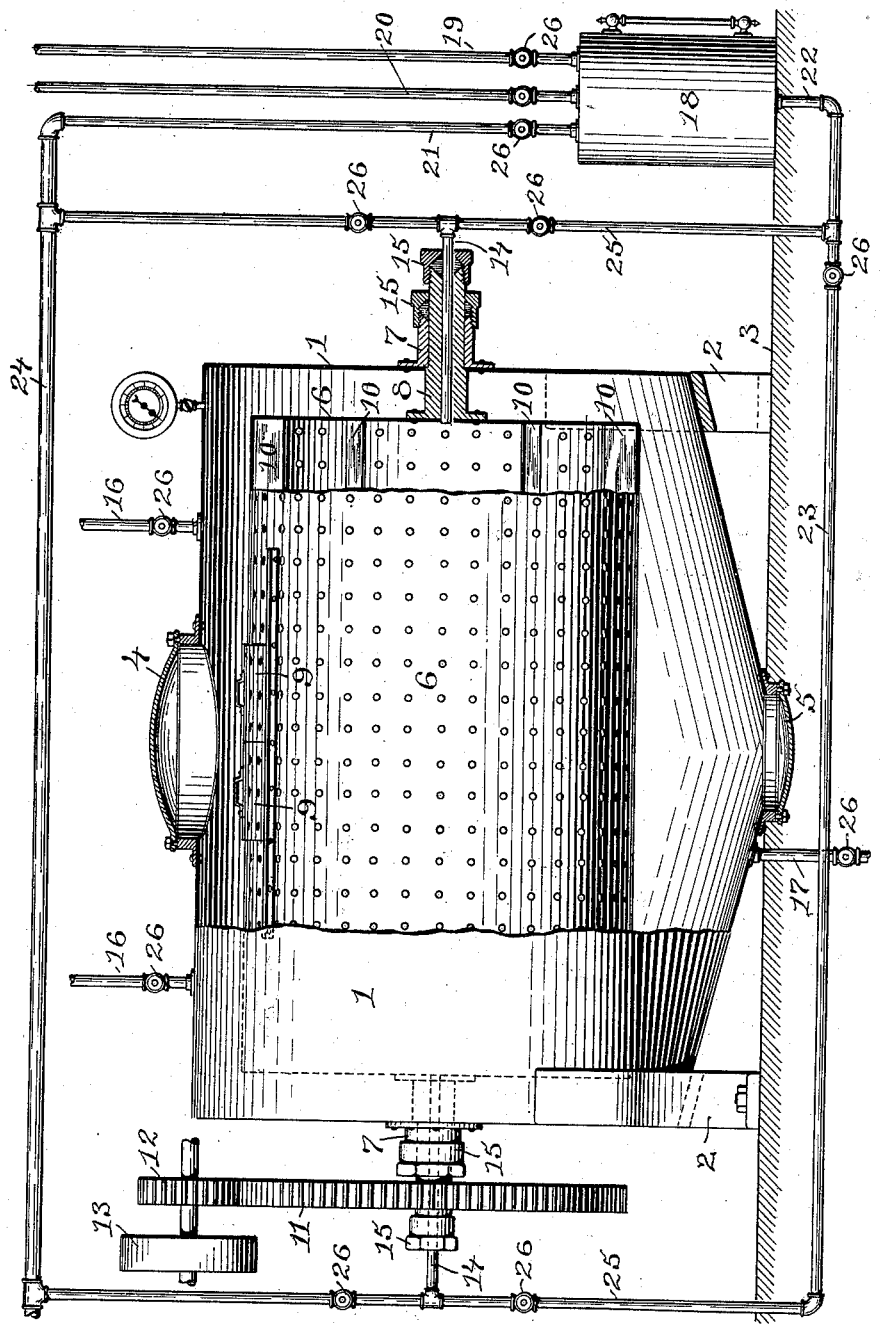
WITNESSES:
A. E. Hagerty
Chas. H. Luther Jr.
INVENTOR:
James Prisley
by Joseph H. Miller & Co.
Attys

UNITED STATES PATENT OFFICE.

JAMES PRISLEY, OF PAWTUCKET, RHODE ISLAND.

DIGESTER.

SPECIFICATION forming part of Letters Patent No. 611,393, dated September 27, 1898.

Application filed October 4, 1897. Serial No. 654,004. (No model.)

*To all whom it may concern:*

Be it known that I, JAMES PRISLEY, a subject of the Queen of Great Britain, residing at Pawtucket, in the county of Providence and State of Rhode Island, have invented a new and useful Improvement in Digesters; and I hereby declare that the following is a full, clear, and exact description of the same, reference being had to the accompanying drawing, forming part of this specification.

This invention has reference to an improvement in a digester or closed vessel adapted for rendering lard and extracting the fats from bones, hides, and other fatty material.

The invention consists in the peculiar and novel construction and the combination of parts whereby the rendering of lard and the extracting of glue are facilitated, as will be more fully set forth hereinafter.

The drawing is a side view, partly broken away and shown partly in section, of my improved digester.

In the drawing, 1 indicates a strong cylindrical vessel built to withstand internal steam-pressure and having the sides of its bottom portion converging downwardly, and 2 supporting-frames for the same resting on the floor or platform 3. On the top of the vessel 1 is the manhole 4, closed by a removable or hinged cover which can be opened for the insertion of material to be subjected to the cooking or extracting process. On the bottom is a similar manhole 5, provided with a cover for the removal of the refuse material. Within the vessel 1 is placed the cylindrical rotary chamber 6, supported in the bearings 7, secured to the opposite ends of the vessel 1. The journals 8, secured to the opposite ends of the rotary chamber 6, extend through and are supported in the bearings 7.

The rotary chamber 6 is made of perforated sheet metal. It is provided with the sliding doors 9, through which, when in the position shown in the drawing, the material is placed through the manhole 4 into the rotary chamber 6. On the interior of the rotary chamber the inwardly-projecting flanges 10 are secured to the perforated wall of the chamber to form a succession of inwardly-projecting shelves, which while they strengthen the walls of the rotary chamber also act to lift the material and tumble the same as the chamber is rotated.

On one of the journals 8 the gear-wheel 11 is secured. The gear 12 engages with the gear 11 and has on its shaft the pulley 13, to which power is conveyed by a belt. Through the journals 8 extend the pipes 14 14. The rotating joints of the journals 8 are made tight by the stuffing-boxes 15 15, constructed in the usual manner. The steam inlet and outlet pipes 16 16, provided with suitable valves, are connected with the upper part of the vessel 1, and the draw-off pipe 17, also provided with a cock or valve, is connected with the lower part of the vessel or casing 1. The chamber 18 is provided with the water-pipe 19 and the steam-pipe 20. The pipe 21 is connected with the upper part of the chamber 18 and the pipe 22 with its lower part. The pipe 22 connects with the lower horizontal pipe 23 and the pipe 21 with the upper horizontal pipe 24, and these horizontal pipes are connected by the vertical pipes 25 25 with the pipes 14 14, which extend through the journals 8 8 into the rotating chamber 6. Suitable valves 26 26 are placed in the pipes, as shown in the drawing, to control the flow of the steam or water through the same.

To enable others skilled in the art to use my improved digester, I will now describe the operation of the same.

The cover of the manhole 4 being removed and the doors 9 9 opened, the material from which lard, tallow, or glue is to be extracted is placed into the rotating chamber 6, the doors 9 9 are closed, the cover of the manhole 4 is now secured, and steam is let into the vessel 1. The steam passes through the perforations into the chamber 6. Steam may also be forced into the center of the material in the chamber 6 by opening the valve in the pipe 21 and the upper valves in the pipes 25, so that the steam will flow through the pipes 14 into the center of the chamber 6. To facilitate the separation of the lard, tallow, or glue, I inject hot water into the mass of the material in the chamber 6, and to this end I close the valves in the pipes 21 and 25, heretofore described as opened, and open the lower valves in the pipes 25 and also the valve in the steam-pipe 20. The pressure of the steam acting on the water in the chamber 18 forces the water through the pipes 23 and 25 and through the pipes 14 into the mass of the material and washes out the melted lard, tallow, or glue, which, passing with the water through the perforations of the walls of the chamber 6, is collected in the bottom of the casing or vessel 1 and may be drawn off by the pipe 17. During this process the chamber 6 is rotated by means of the gears 11 and 12. The shelf or flanges 10 continually raise some of the material from the lower part and drop it from the upper part of the chamber, thus keeping the material constantly in motion and tumbling the same over and over to expose it to the action of the steam and the water, thereby materially facilitating the operation. When the material is deprived of practically the lard, tallow, or glue it contained, the rotation of the chamber 6 is stopped in the position where the doors 9 are at the bottom, the manhole 5 is opened, the doors 9 are opened, and the waste material discharged. To facilitate this, the chamber 6 may be slowly revolved while the doors 9 9 are open. The hot water and oil or fatty matter are usually drawn into a shallow vessel and allowed to cool or at least to settle sufficiently to remove the fatty matter or collect the same by slowly drawing off the water.

I have elected to show in the drawing the construction which I have found efficient in carrying out my invention. I do not wish, however, to confine myself to the exact construction shown, as the same may be altered without departing from the spirit of my invention. The water-chamber 18 may thus be placed at such a height above the digester as to deliver the water into the same with sufficient force without the use of the steam-pipe 20.

Having thus described my invention, I claim as new and desire to secure by Letters Patent—

1. In a digester the combination of the outer vessel having the sides of its bottom converging downwardly, an internal cylindrical chamber having perforated sides, sliding doors closing openings in said sides, horizontal journals on the two ends of the inner chamber, pipes extending through said journals, a steam and water supply chamber connected with the journal-pipes, a steam-supply pipe entering the periphery of the outer vessel and another steam-pipe leading out of said periphery, with mechanism for rotating the inner cylinder substantially as described.

2. In a digester the combination of the outer vessel 1, having the sides of its bottom converging downwardly toward its bottom manhole, the journal-bearings 7, 7, on the ends of said vessel, the steam-pipes 16, 16, in the top of said vessel and the drawing-off pipe 17 in the bottom, the perforated chamber 6 having sliding doors 9, the hollow journals 8 on the ends of the chamber 6, the pipes 14 extending through the journal 8, the steam and water supply chamber 18 having leading in its top a water-pipe 19 and a steam-pipe 20, and pipes 21 and 22 leading from its top and bottom into the inner cylinder, whereby steam or water may be injected through the journals substantially as and for the purpose described.

In witness whereof I have hereunto set my hand.

JAMES PRISLEY.

Witnesses:
JOSEPH A. MILLER, Jr.,
B. M. SIMMS.